United States Patent
Kim et al.

(10) Patent No.: US 9,676,335 B2
(45) Date of Patent: Jun. 13, 2017

(54) BACK LIGHT UNIT FOR OUTSIDE MIRROR OF VEHICLE

(71) Applicants: Hyundai Motor Company, Seoul (KR); Kia Motors Corporation, Seoul (KR); S L Mirrortech Corporation, Siheung-si (KR); JS Automotive Inc., Incheon (KR)

(72) Inventors: Geon Jin Kim, Gunpo-si (KR); Byoung Gyu Park, Suwon-si (KR); Jong Sik Bae, Suwon-si (KR); Chan Mook Choi, Incheon (KR); Seung Ju Yang, Ansan-si (KR); Se Been Oh, Goyang-si (KR); Byoung Gon Choi, Daegu (KR); Hyun Dong Lee, Daegu (KR); Dae Soo Shin, Busan (KR)

(73) Assignees: Hyundai Motor Company, Seoul (KR); Kia Motors Corporation, Seoul (KR); S L Mirrortech Corporation, Siheung-si (KR); JS Automotive Inc., Incheon (KR)

(*) Notice: Subject to any disclaimer, the term of this patent is extended or adjusted under 35 U.S.C. 154(b) by 0 days.

(21) Appl. No.: 14/570,137

(22) Filed: Dec. 15, 2014

(65) Prior Publication Data
US 2015/0251603 A1    Sep. 10, 2015

(30) Foreign Application Priority Data
Mar. 6, 2014    (KR) .................. 10-2014-0026337

(51) Int. Cl.
*B60Q 1/26*     (2006.01)
*B60R 1/08*     (2006.01)
(Continued)

(52) U.S. Cl.
CPC ............ *B60R 1/081* (2013.01); *B60R 1/1207* (2013.01); *G02B 6/002* (2013.01); *G02B 6/0051* (2013.01); *G02B 6/0053* (2013.01)

(58) Field of Classification Search
CPC ..... B60R 1/081; B60R 1/1207; G02B 6/0053; G02B 6/0051; G02B 6/002
(Continued)

(56) References Cited

U.S. PATENT DOCUMENTS 5,211,463 A * 5/1993 Kalmanash .......... G02B 6/0051
                                                    349/104
5,703,667 A * 12/1997 Ochiai ................. G02B 6/0038
                                                    349/65
(Continued)

FOREIGN PATENT DOCUMENTS

JP          2014-17060 A       1/2014
KR     10-2005-0109327 A      11/2005
(Continued)

*Primary Examiner* — Bryon T Gyllstrom
(74) *Attorney, Agent, or Firm* — Morgan Lewis & Bockius LLP

(57) ABSTRACT

A back light unit for an outside mirror of a vehicle for optimizing a light-emitting structure of an LED to improve uniformity of light emission and brightness of light so that night visibility for a driver can be improved may include a bottom case, a light source seated on an inner lower side of the bottom case and emitting light when an electric power is supplied, a light guide plate positioned on an inner upper side of the bottom case and uniformly diffusing light emitted from the light source and transferring the light to a prism plate, the prism plate disposed in front of the light guide plate at the inner upper side of the bottom case and refracting and refocusing light from the light guide plate to increase surface brightness, and a top case coupled to a front end of the bottom case.

6 Claims, 6 Drawing Sheets

(51) Int. Cl.
*B60R 1/12* (2006.01)
*F21V 8/00* (2006.01)

(58) Field of Classification Search
USPC .......................................................... 362/494
See application file for complete search history.

(56) References Cited

U.S. PATENT DOCUMENTS

| | | | | |
|---|---|---|---|---|
| 5,729,311 | A * | 3/1998 | Broer | G02B 6/0056 349/57 |
| 5,844,720 | A * | 12/1998 | Ohara | F21V 5/02 359/599 |
| 6,480,307 | B1 * | 11/2002 | Yang | G02B 5/0215 349/65 |
| 6,570,710 | B1 * | 5/2003 | Nilsen | G02B 1/11 359/251 |
| 6,575,584 | B1 * | 6/2003 | Habraken | G02B 6/0033 362/327 |
| 6,662,642 | B2 | 12/2003 | Breed et al. | |
| 7,452,119 | B2 * | 11/2008 | Onishi | G02B 6/0036 362/235 |
| 2004/0207996 | A1 * | 10/2004 | Kao | G02F 1/133604 362/633 |
| 2004/0223313 | A1 * | 11/2004 | Yu | F21V 19/04 362/613 |
| 2005/0099822 | A1 * | 5/2005 | Choi | G02B 5/0236 362/561 |
| 2005/0146895 | A1 * | 7/2005 | Hsieh | G02F 1/133608 362/613 |
| 2006/0146562 | A1 * | 7/2006 | Ko | G02B 6/0053 362/561 |

FOREIGN PATENT DOCUMENTS

| | | |
|---|---|---|
| KR | 10-2009-0027450 A | 3/2009 |
| KR | 10-2012-0062215 A | 6/2012 |
| KR | 10-2014-0001114 U | 2/2014 |
| KR | 20-2014-0001114 U | 2/2014 |

* cited by examiner

Etched in the form of indicator icon

BACK LIGHT UNIT FOR OUTSIDE MIRROR OF VEHICLE

CROSS-REFERENCE TO RELATED APPLICATION

The present application claims priority to Korean Patent Application No. 10-2014-0026337 filed Mar. 6, 2014, the entire contents of which is incorporated herein for all purposes by this reference.

BACKGROUND OF THE INVENTION

Field of the Invention

The present invention relates to a back light unit for an outside mirror of a vehicle. More particularly, it relates to a back light unit for an outside mirror of a vehicle for optimizing a light-emitting structure of LED of the outside mirror to improve visibility of a driver.

Description of Related Art

A blind spot detection (BSD) system of a vehicle is a rear lateral side alarming apparatus for detecting an obstacle approaching a blind spot of a rear lateral side of the vehicle and for providing information about the approaching obstacle to a driver during the traveling.

An existing BSD system usually includes a BSD module (or an indicator module) installed in the outside mirror of a vehicle. The BSD module is attached to a rear side of glass on which an indicator icon is etched.

As illustrated in FIG. 1, an existing BSD module includes an LED 30 and a reflector 40 that are mounted on a printed circuit board (PCB) 20 and is attached to a rear side of glass 50 using a double-sided tape and a glass holder.

The BSD module provides an alarm that an obstacle approaches to a driver such that light is emitted from the activated LED when an obstacle approaching the rear lateral side of a vehicle is detected, and is reflected by the reflector 40 and transmits indirectly the indicator icon etched on the mirror surface to emit the light outside the glass.

However, since the existing BSD module reflects the light from the LED using the reflector to emit the light through the etched portion of the glass, the existing BSD module has a limit to make a uniform distribution and brightness of light.

Due to the limit of the existing BSD module, non-uniform distribution of light by the outside mirror occurs continuously and the visibility of a driver is inferior at night.

If imported goods are used to solve the above-mentioned problem, costs increase and thus there is a limit to apply all kinds of vehicles.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a back light unit for an outside mirror of a vehicle for optimizing a light-emitting structure of an LED to improve uniformity of light emission and brightness of light so that night visibility for a driver can be improved.

According to various aspects of the present invention, a backlight unit for an outside mirror of a vehicle may include a bottom case; a light source seated on an inner lower side of the bottom case and emitting light when an electric power is supplied, a light guide plate positioned on an inner upper side of the bottom case and uniformly diffusing light emitted from the light source and transferring the light to a prism plate, the prism plate disposed in front of the light guide plate at the inner upper side of the bottom case and refracting and focusing light from the light guide plate to increase surface brightness, and a top case coupled to a front end of the bottom case.

The backlight unit may further include a diffuser sheet disposed in front of the prism plate at the inner upper side of the bottom case and uniformly diffusing light from the prism plate forward.

The top case may be made in the form of a frame with an open center portion and a protect plate may be securely coupled to the open center portion through which light is transmitted.

The backlight unit may further include a reflector disposed at a rear side of the light guide plate in the inner upper side of the bottom case and reflecting light leaking from the rear side of the light guide plate.

The light guide plate may include irregular patterns formed on a rear side of the light guide plate and diffusing the light emitted from the light source, and the patterns are relatively loose near to the light source and are compact away from the light source.

The prism plate may include a base layer, and a prism layer laminated on the base layer; in which the prism layer includes micro-lenses protruding from a surface on which a plurality of prisms are continuously formed throughout.

The backlight unit for an outside mirror of a vehicle according to the present invention includes an optimized light-emitting structure of an LED such that uniformity of light-emission and brightness are improved in comparison to the existing backlight unit so that night visibility for a driver can be also enhanced and replace imported goods to reduce costs.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various aspects of the present invention relate to a back light unit for an outside mirror of a vehicle. More particularly, various aspects of the present invention optimize uniformity of light-emission and brightness of a backlight unit (an indicator module) attached to a rear side of glass of an outside mirror of a vehicle so that visibility of a driver can be improved.

Figure 1:
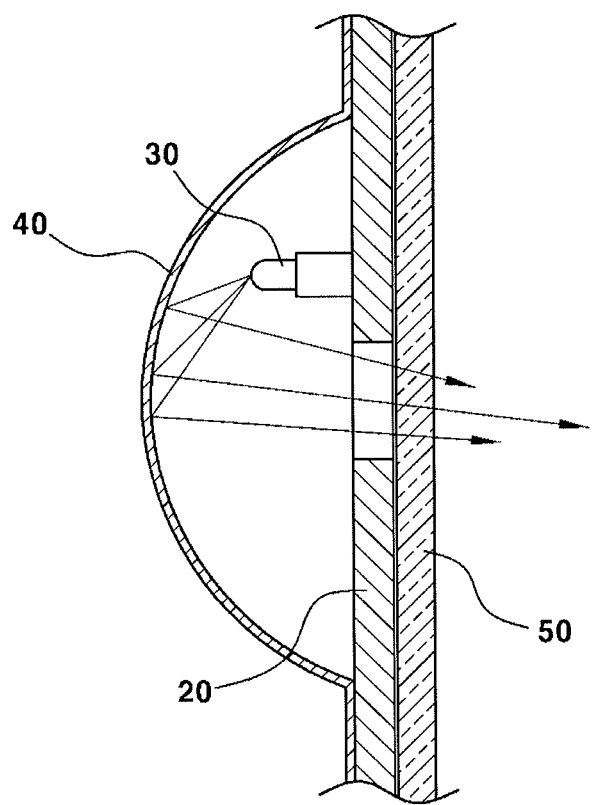
FIG. 1 is a sectional view illustrating a BSD module constructing an existing BSD system in the related art.
Figure 2:
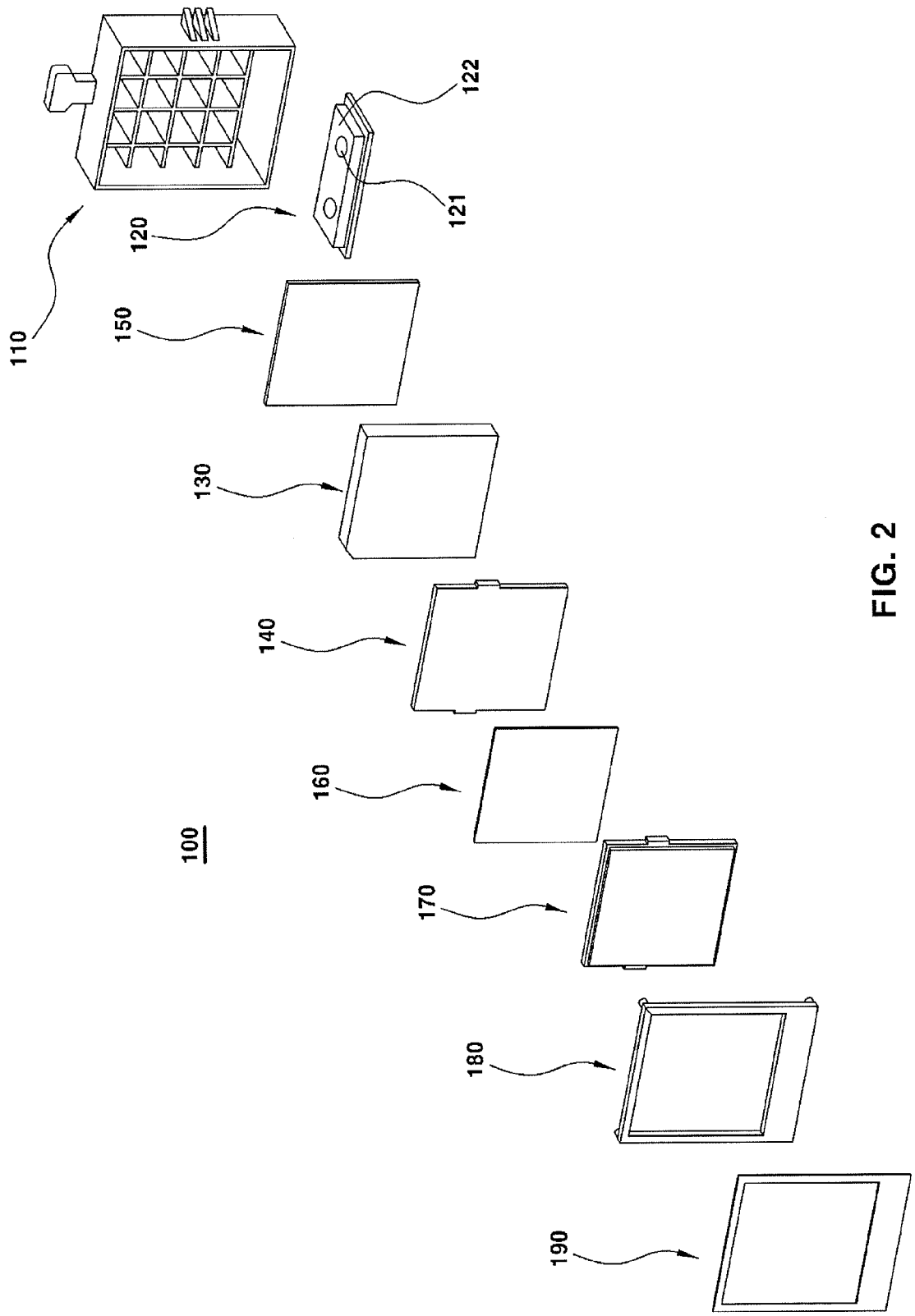
FIG. 2 is an exploded perspective view illustrating an exemplary backlight unit for an outside mirror of a vehicle according to the present invention.
Figure 3:
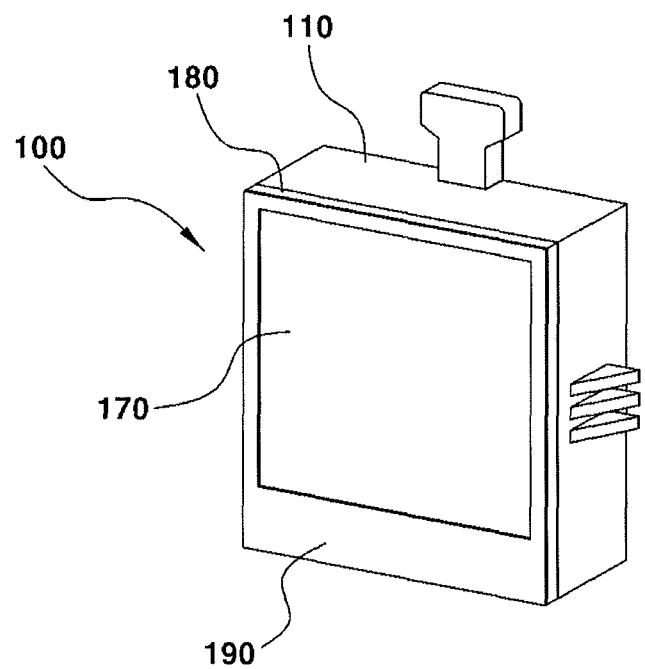
FIG. 3 is a perspective view illustrating an outer appearance of the exemplary backlight unit for the outside mirror of the vehicle according to the present invention.

As shown in FIG. 2, a backlight unit 100 for an outside mirror of a vehicle according to various embodiments of the present invention is configured to optimize light-emission structure of an LED, and as illustrated in FIGS. 2 and 3, includes a bottom case 110, a light source 120, a light guide plate (LGP) 130, a prism plate 140, a reflector 150, a diffuser sheet 160, a protect plate 170, and a top case 180.

The bottom case 110 has an internal space to accommodate internal parts such as the light source 120, the light guide plate 130, the prism plate 140, the reflector 150, and the diffuser sheet 160. The bottom case 110 supports the internal parts fixedly to prevent movements of the internal parts and to protect the internal parts from the outside. The bottom case 110 has an opened front side such that light emitted from the light source 120 may transmit therethrough.

Figure 4:
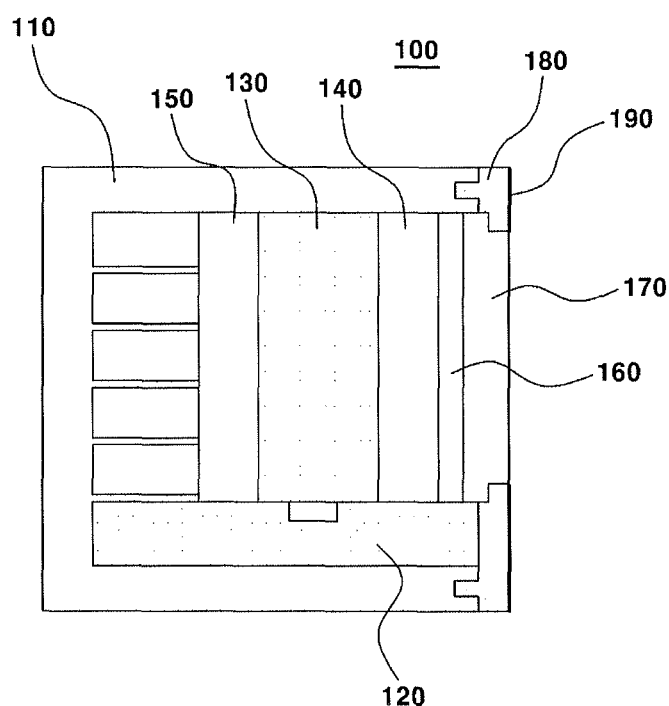
FIG. 4 is a front sectional view illustrating the exemplary backlight unit for the outside mirror of a vehicle according to the present invention.

The light source 120 emits light when an electric power is supplied from the outside, may be a printed circuit board on which an LED 121 is mounted, and is seated on an inner lower side of the bottom case 110 as illustrated in FIG. 4.

The light guide plate 130 diffuses incident light into whole area of the light guide plate 130 uniformly using a pattern (an optic) on the rear surface thereof to make a line light source or a spot light source into a surface light source. The light guide plate 130 is seated on the inner upper side of the bottom case 110 on the upper side of the light source 120, receives light emitted from the light source 120 and diffuses and transmits the incident light on the prism plate 140 uniformly.

Figure 5:
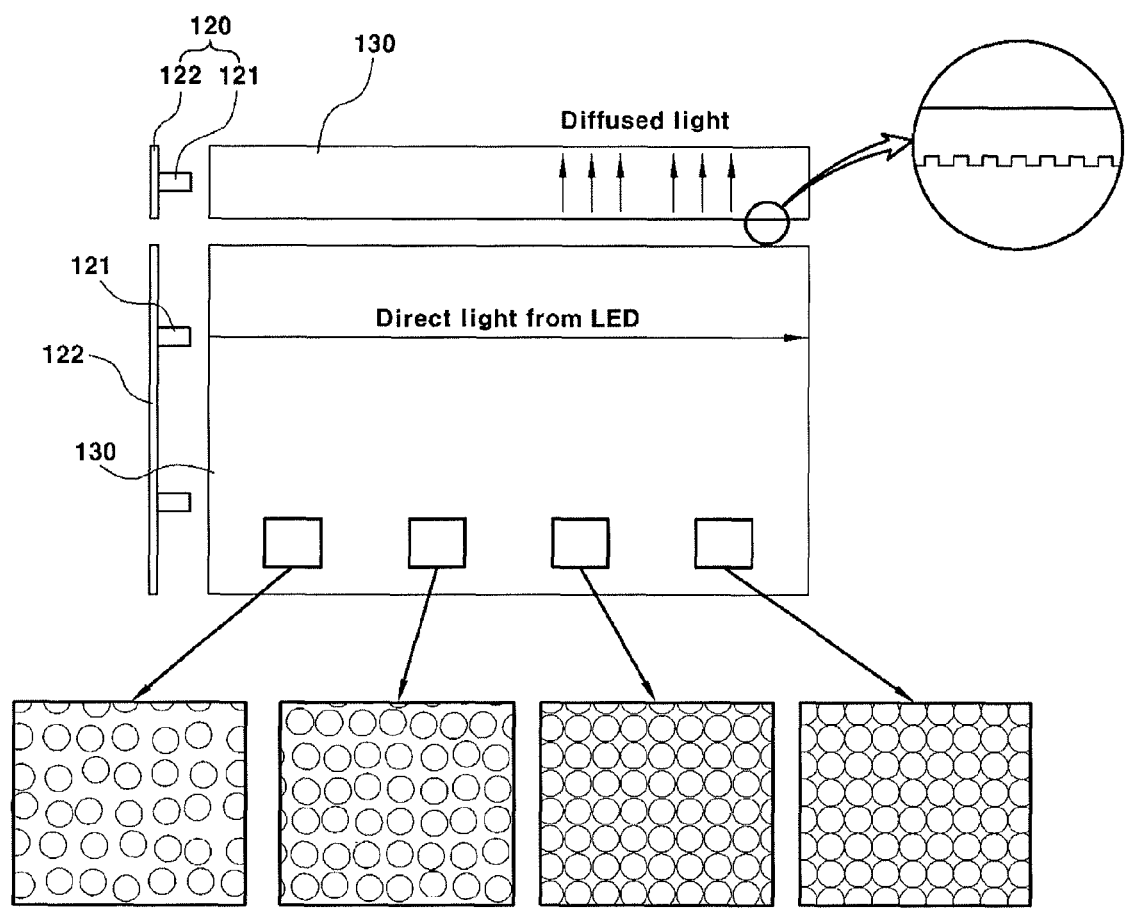
FIG. 5 is a view illustrating configuration of a light guide plate in the exemplary backlight unit for the outside mirror of a vehicle according to the present invention.

As illustrated in FIG. 5, the light guide plate 130 has patterns that are irregular and relatively loose near to the light source 120 and relatively compact as being away from the light source 120.

Then, the light guide plate 130 reduces a difference between diffused reflection light from a position relatively near to the light source 120 and diffused reflection light from a position relatively away from the light source 120 such that brightness of light transmitted through and diffused from the light guide plate 130 may be uniform.

The patterns of the light guide plate 130 may be produced on the rear side of the light guide plate 130 in various manners, for example, by printing, a V-cut method, and a mold.

The printing is carried out by printing the patterns on the rear side with ink such that incident light from the light source 120 may be diffused, the V-cut method is carried out by forming V-shaped recesses on the rear side of the light guide plate 130 such that the incident light may be diffused, and the molding method is carried out by forming unevenness on the rear side of the light guide plate 130 such that the incident light may be diffused.

The prism plate 140 controls the light transmitting through the light guide plate 130 to be refracted and focused resulting in increasing surface brightness of the backlight unit 100, and is seated on the inner upper side of the bottom case 110 in front of the light guide plate 130.

Figure 6:
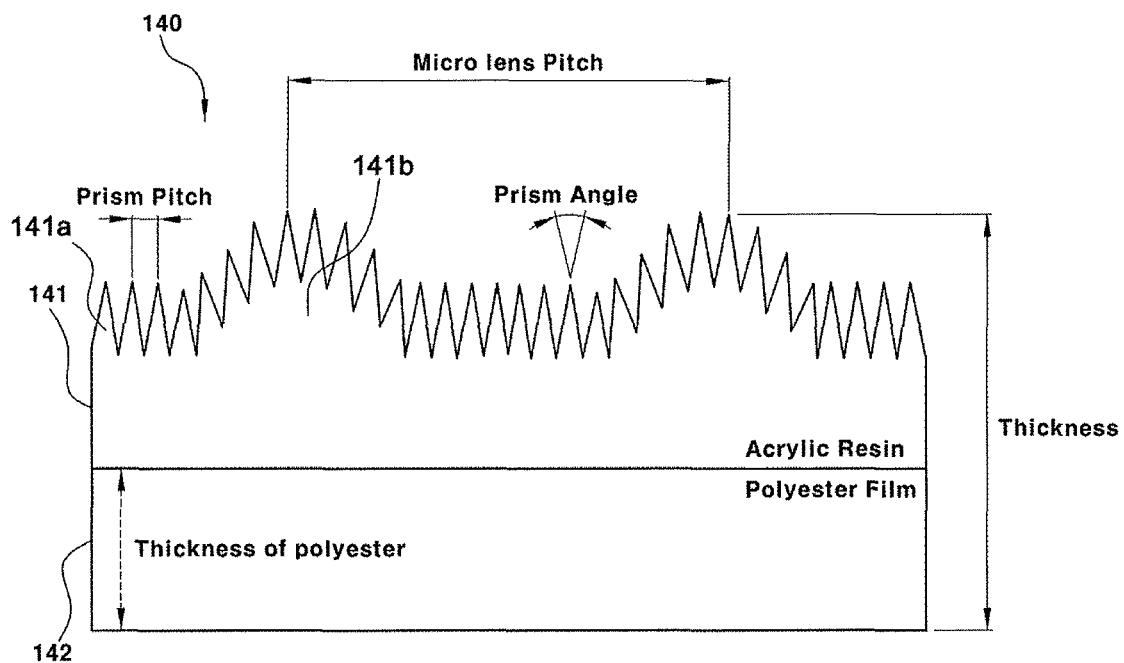
FIG. 6 is a view illustrating configuration of a prism plate in the exemplary backlight unit for the outside mirror of a vehicle according to the present invention.

As illustrated in FIG. 6, the prism plate 140 includes a prism layer 141 made of acrylic resin and a base layer 142 made of a polyester film. The prism layer 141 includes a surface with a combinations of a plurality of prisms (sharp protrusions) 141a and micro-lenses (sharp protrusions) 141b and is laminated and bonded on the flat base layer 142.

Specifically, the prism layer 141 includes a plurality of prisms 141a continuously formed on an entire surface (a surface emitting light toward the diffuser sheet 160) and the surface, on which the prisms 141a are formed, has the micro-lenses 141b protruding in a spherical shape, in which each of the micro-lenses 141b are arranged by preset intervals.

The prism plate 140 controls the light from the light guide plate 130 to be refracted, to be totally reflected, to be focused, or to be transferred uniformly with operations of a precise and fine combined prism and brightness and a viewing angle of the backlight unit 100.

As referring to FIG. 6, a prism pitch indicates a distance between respective prisms 141a and increases surface brightness of the backlight unit 100, a micro-lens pitch indicates a distance between the respective micro-lenses 141b and makes concentration rate of the incident light of the prism plate 140 and high efficient use of the light, and the prism angle is an angle of the prisms 141a and refracts the light resulting in increasing of brightness.

Thus, the prism plate 140 adjusts the prism pitch and the prism angle of the prism layer 141 to increase the surface brightness of the backlight unit 100, adjusts the micro-lens pitch to increase concentration ratio of the incident light passing through the light guide plate 130 and use ratio of the light passing through the light guide plate 130.

For example, the prism plate 140 may include the prism layer 141 with the prism pitch of 21 micrometers and the prism angle of 90 degrees and the base layer 142 of thickness of 75 micrometers. Total thickness of the prism layer 141 and the base layer 142 may be 94 micrometers from the top point of the prism layer 141.

Although not illustrated in the drawings, the prism plate 140 is configured such that the base layer 142 faces the light guide plate 130 in the bottom case 110 and the prism layer 141 faces the diffuser sheet 160.

The bottom case 110 includes the reflector 150 disposed at the rear side of the light guide plate 130 in the inner upper side of the bottom case 110 to reflect light leaking backward from the light guide plate 130.

The reflector 150 reflects the light leaking to the rear side of the light guide plate 130 to the front side of the light guide plate 130 and the backlight unit 100 resulting in preventing loss of the light.

The bottom case 110 includes the diffuser sheet 160 disposed in front of the prism plate 140 in the inner upper side of the bottom case 110.

The diffuser sheet 160 diffuses uniformly the light from the prism plate 140 during the transmission of the light and then achieves uniform brightness and color of the backlight unit 100.

Water sealing is made by welding between outer parts such that the top case 180 bonded to the front end of the bottom case 110 is made in the form of a frame with an opened center portion and the protect case 170 made of a material transmitting light is securely coupled to the opened center portion by welding.

The top case 180, as illustrated in FIG. 4, may be bonded to the front end of the bottom case 110 by welding after the protect plate 170 is securely coupled to the center portion or may be integrally bonded to the front end of the bottom case 110 while the protect plate 170 is integrally formed with the opened center portion.

The protect plate 170 protects the internal parts accommodated in the bottom case 110 as like the diffuser sheet 160 and transmits the light from the inside of the bottom case 110, and further diffuses light from the bottom case 110 to the outside.

Although not illustrated in the drawings, the protect plate 170 may further include a protect film provided on the surface (a front surface).

The protect film is detachably attached to the surface of the protect plate 170 and prevents the protect plate 170 from being scratched during transportation.

The backlight unit 100 is attached to the rear side of glass for the outside mirror after removing the protect film.

Figure 7:
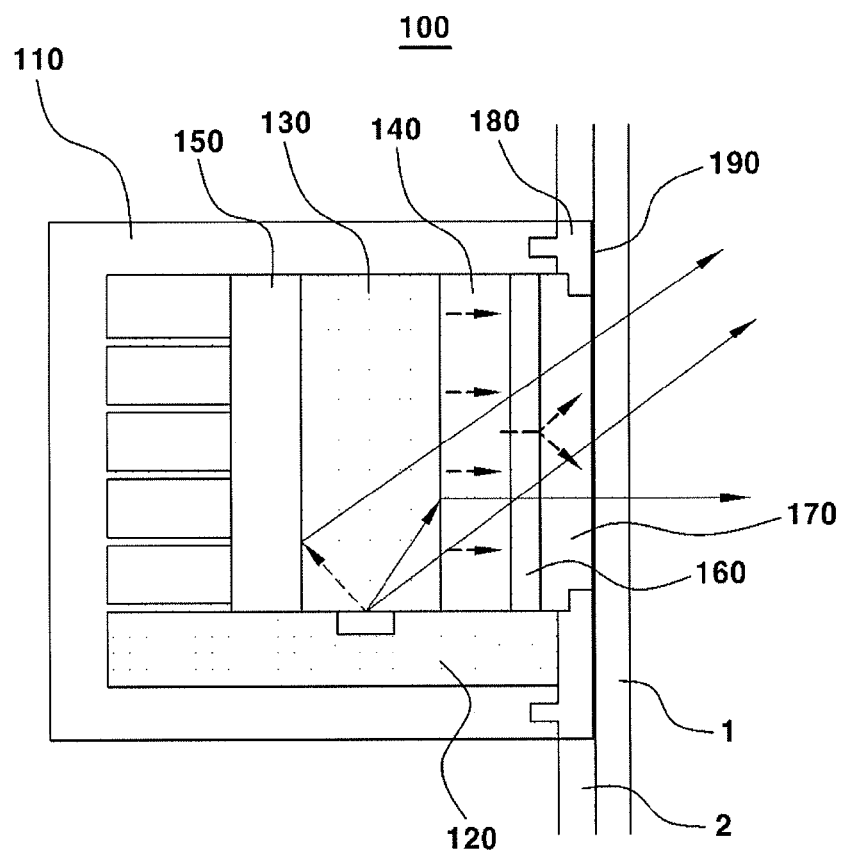
FIG. 7 is a sectional view schematically illustrating a principle of light emission of the exemplary backlight unit attached to a rear side of the outside mirror of the vehicle, according to the present invention.

Referring to FIG. 7, the backlight unit 100 is fixed to the rear side of the glass 1 for the outside mirror with a glass holder 2, and in this case a double-sided adhesive tape 190 is applied to the surface (the front surface) of the top case 180 for the improvement of sealing between the glass 1 and the backlight unit 100.

The double-sided tape 190 serves as a sealing material for close attachment and bonding between the glass 1 for the outside mirror and the top case 180 of the backlight unit 100 and prevents the light from leaking between the glass 1 an the top case 180.

Referring to FIG. 7, according to the backlight unit 100 attached to the rear side of the glass 1 for the outside mirror, the light from the light source 120 is uniformly diffused through the light guide plate 130 forward, the light lost rearward of the light guide plate 130 is reflected forward through the reflector 150, the light passed through the light guide plate 130 is refracted and collected through the prism plate 140 resulting in increasing the surface brightness, and finally the light converted into uniform brightness and color by the diffuser sheet 160 is emitted outside.

At this time, the emitted light is transferred to the rear side of the glass 1 for the outside mirror and finally emitted toward the front side (a mirror surface) of the glass 1 through the etched portion of the glass 1.

Figure 8:
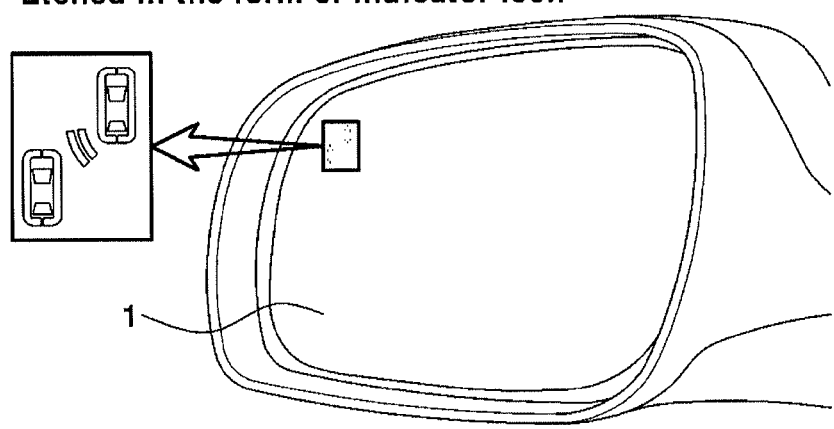
FIG. 8 is a view illustrating the outside mirror of the vehicle to which the exemplary backlight unit is applied, according to the present invention.

As illustrated in FIG. 8, the glass 1 for the outside mirror includes the front side etched with an indicator icon so that the light is emitted outside through the etched portion when the backlight unit attached to the rear side of the glass 1 for the outside mirror emits light, such that a driver notices that an obstacle has approached the rear lateral blind spot.

The backlight unit attached to the rear side of the glass 1 emits light according to a signal of a system occurring when an obstacle approaching the rear lateral side of a vehicle is detected.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A backlight unit for an outside mirror of a vehicle, the apparatus comprising:
   a glass including an etched portion at a front side of the glass and a mirror surface at a rear side of the glass, wherein the etched portion is etched with an indicator icon and configured to notice that an obstacle approaches to a driver;
   a bottom case attached to the rear side of the glass;
   a light source seated on an inner lower side of the bottom case and emitting light;
   a light guide plate positioned on an inner upper side of the bottom case and uniformly diffusing light emitted from the light source and transferring the light to a prism plate;
   the prism plate directly disposed in front of the light guide plate at the inner upper side of the bottom case and refracting and focusing light from the light guide plate to increase surface brightness;
   a diffuser sheet disposed in front of the prism plate; and
   a top case coupled to a front end of the bottom case,
   wherein the prism plate includes:
   a base layer; and
   a prism layer laminated on the base layer,
   wherein the base layer faces the light guide plate in the bottom case and the prism layer faces the diffuser sheet to increase the surface brightness of the backlight unit, wherein the emitted light is transferred to the rear side of the glass and emitted toward the mirror surface of the glass through the etched portion of the glass.

2. The backlight unit of claim 1, further comprising the diffuser sheet disposed in front of the prism plate at the inner upper side of the bottom case and uniformly diffusing light from the prism plate forward.

3. The backlight unit of claim 1, wherein the top case is made in the form of a frame with an open center portion and a protect plate is securely coupled to the open center portion through which light is transmitted.

4. The backlight unit of claim 1, further comprising a reflector disposed at a rear side of the light guide plate in the inner upper side of the bottom case and reflecting light leaking from the rear side of the light guide plate.

5. The backlight unit of claim 1, wherein the light guide plate includes irregular patterns formed on a rear side of the light guide plate and diffusing the light emitted from the light source, and the patterns are relatively loose near to the light source and compact away from the light source.

6. The backlight unit of claim 1, wherein the prism layer includes micro-lenses protruding from a surface on which a plurality of prisms are continuously formed throughout.

* * * * *